Sept. 9, 1969 A. F. SCHMECKENBECHER 3,466,620

DISC BULK MEMORY

Filed Dec. 24, 1964

INVENTOR
ARNOLD F. SCHMECKENBECHER

BY Sughrue, Rothwell, Mion, Zinn & Macpeak
ATTORNEYS

United States Patent Office 3,466,620

Patented Sept. 9, 1969

3,466,620

DISC BULK MEMORY

Arnold F. Schmeckenbecher, Poughkeepsie, N.Y., assignor to International Business Machines Corporation, New York, N.Y., a corporation of New York Filed Dec. 24, 1964, Ser. No. 420,964
Int. Cl. G11b *5/00*
U.S. Cl. 340—174 3 Claims

ABSTRACT OF THE DISCLOSURE

In a thin film type of memory device, the current carrying members which control and sense storage of information also provide the structural interconnection between the individual memory cells. Each cell comprises a pair of disc-shaped conductor elements separated by a disc-shaped insulating element, plus a film of magnetic material covering the entire disc. The two conductive disc-shaped members for each cell are connected to other memory cells in respective rows and columns by means of conductive necks. The interconnecting necks may be split and widened at their point of connection with the discs to provide a path of least reluctance along the desired magnetization axis.

The invention relates to a magnetic storage matrix of the thin film type having uniaxial or biaxial anisotropy.

Magnetic storage elements and matrices are well known and widely used in computers and data processing systems. The more recent uses of thin magnetic films for the storage elements have the advantages of decreased thickness, smaller volume, higher switching speeds, and reduced magnetic energy necessary for switching. Thin magnetic films may be produced in different ways, for example by evaporation in a vacuum, by a cathode sputtering in a gaseous atmosphere, and by electroplating as discussed by T. D. Knorr, in Technical Report No. 3, September 1958, prepared by Case Institute of Technology, Atomic Energy Division, and entitled "Geometric Dependence of Magnetic Anisotropy in Thin Iron Films." The films are produced to exhibit uniaxial magnetic anisotropy. The term uniaxial magnetic anisotropy is understood to mean that there is a tendency of the magnetization throughout the film to align in one preferred distinct direction, or else in a direction anti-parallel to the preferred direction. This preferred direction is termed "easy axis," and that perpendicular to the easy axis is termed "hard axis."

It should be noted, that anisotropic differs from isotropic material in that isotropic material exhibits the same property or properties in every direction, whereas anisotropic films do not exhibit the isotropic phenomena, that is, isotropic films or mediums exhibit no preferred direction of magnetization, while anisotropic mediums or films exhibit some preferred direction.

The advantages and uses of storage elements having uniaxial anisotropy, otherwise known as magnetic materials having a single easy axis, is well known in the art and will not be discussed herein. Another type of storage element of the thin magnetic film type exhibits a biaxial anisotropic characteristic. Such elements are disclosed in U.S. Patent No. 3,071,756, by E. W. Pugh, titled "Magnetic Memory" and issued January 1, 1963. The biaxial anisotropic elements differ from uniaxial anisotropic elements in that they exhibit two axes of "easy" magnetization.

The present invention is concerned with storage matrices having magnetic elements exhibiting either uniaxial or biaxial anisotropy. The present invention is easier to fabricate and has greater stability than prior art storage matrices. The present invention also lends itself to easier packaging techniques since the bit and sense windings normally necessary in magnetic storage matrices are eliminated.

It is therefore an object of the present invention to provide a magnetic storage element and matrix having no windings thereon.

It is a further object of the present invention to provide a magnetic storage matrix of the type using thin magnetic films having either uniaxial or biaxial anisotropy.

It is a further object of the invention to provide a magnetic storage matrix in which the current carrying members are also structural portions of the matrix.

It is still a further object of the invention to provide an improved storage matrix using disc-type thin magnetic film storage elements.

Broadly, the invention comprises a plurality of metallic discs coated with thin magnetic films which are connected together by metallic leads, called necks, which act in the dual capacity of current carrying members and structural elements of the matrix.

The foregoing and other objects, features and advantages of the invention will be apparent from the following more particular description of preferred embodiments of the invention, as illustrated in the accompanying drawings.

Figure 1:
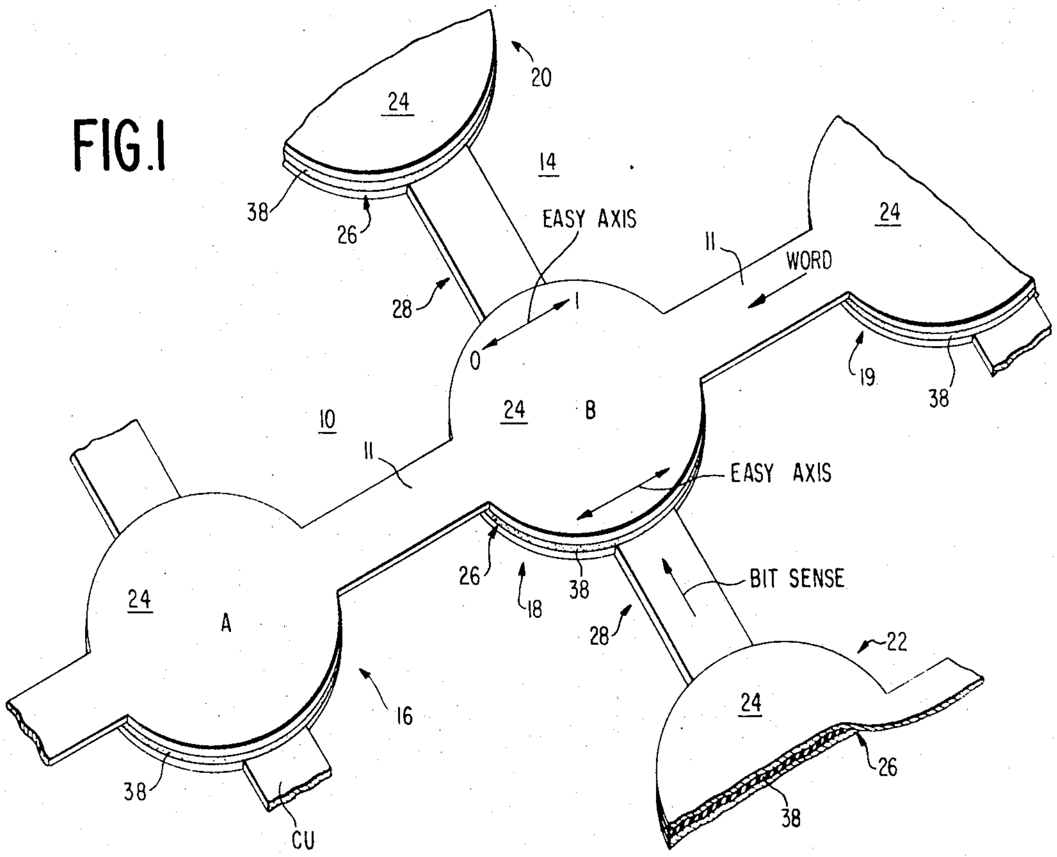
FIGURE 1 is a perspective view of a portion of one embodiment of the inventive storage matrix.

Two-dimensional storage matrices comprise rows and columns of storage elements. In FIGURE 1, only a single row 10 and a single column 14 are shown, however, it is to be understood that the actual storage matrix comprises a plurality of similar columns and rows. Row 10 as shown in FIGURE 1 includes storage elements 16, 18, and 19. Column 14 includes storage elements 20, 18, and 22. As is well known in the art, each individual storage element appears in one row and one column of the matrix. The rows may be formed of a metallic material such as copper which is shaped in the form of discs 24 and necks 11. Each row of metallic material may be of unitary construction for ease of fabrication and may be made by photoetching a copper layer into the desired shape of discs and necks. The columns, for example column 14, comprises a metallic material such as copper formed in the shape of discs 26 and neck elements 28. Each column may be of unitary construction for ease of fabrication and may be formed by a conventional photoetching process. The columns are placed in orthogonal relation to the rows with the metallic discs 24 superimposed on metallic discs 26. For insulation, discs 38 of electrically insulating material are placed in contact with and in between metallic discs 24 and 26. A layer of thin film insulating material covers all exposed portions of the matrix. A thin magnetic film, not shown in the drawing, coats the entire matrix and may be placed thereon by any conventional method. It should be noted that the thin magnetic film may either be removed from the neck portions of the matrix or left covering the entire matrix.

The storage matrix of FIGURE 1 may be fabricated in the following maner: A sheet of material consisting of two copper layers, separated by a thin insulating layer of suitable plastic or glass, for example, is photoetched in such a way that one copper layer contains rows of discs connected by narow necks in a first direction. The other copper sheet is photoetched so that it contains rows of identical discs as the first layer, which are coextensive with the discs of the first layer, but which are connected by necks at 90° to the necks of the first layer. The plastic layer between the copper sheets is removed wherever the copper layers have been etched away, preferably by exposing it to a suitable solvent, leaving the plastic layer only between the metallic discs. The exposed copper surfaces of the matrix are then coated with an insulating layer. Dipping, spraying or depositing by electrophoresis of a suitable plastic, such as polyvinyl butyral, spraying or depositing by electrophoresis of a glass powder with subsequent fusing, cathodic sputtering of silicon monoxide or of tantalum with subsequent oxidation are suitable methods.

The surface of the disc rows is then activated for chemical deposition by conventional methods. A chemical nickel-iron film then is deposited over the matrix. During deposition, a uniform linear magnetic field may be applied in the direction of one of the sets of disc rows, causing, as is well known in the art, an easy axis of magnetization which is parallel to the axis of the row.

The resulting storage matrix is shown partially in FIGURE 1 and comprises disc storage elements which have uniaxial anisotropy, or easy axes of magnetization, in the direction of the rows. The storage matrix is then operable as a two-dimensional memory unit with the row of discs in the easy direction of the magnetic films used as the word lines and the column of discs which are in the orthogonal direction to the easy axis used as the bit and sense lines. Thus, since the switching currents are carried by the metallic necks and discs, the normally used winding are completely eliminated and the result is a structurally stable magnetic storage matrix.

It is also possible to add a third disc to each storage element, and connect the third discs by separate metallic necks to serve as separate sense lines in a matrix operable as a three-dimensional memory.

Figure 2:
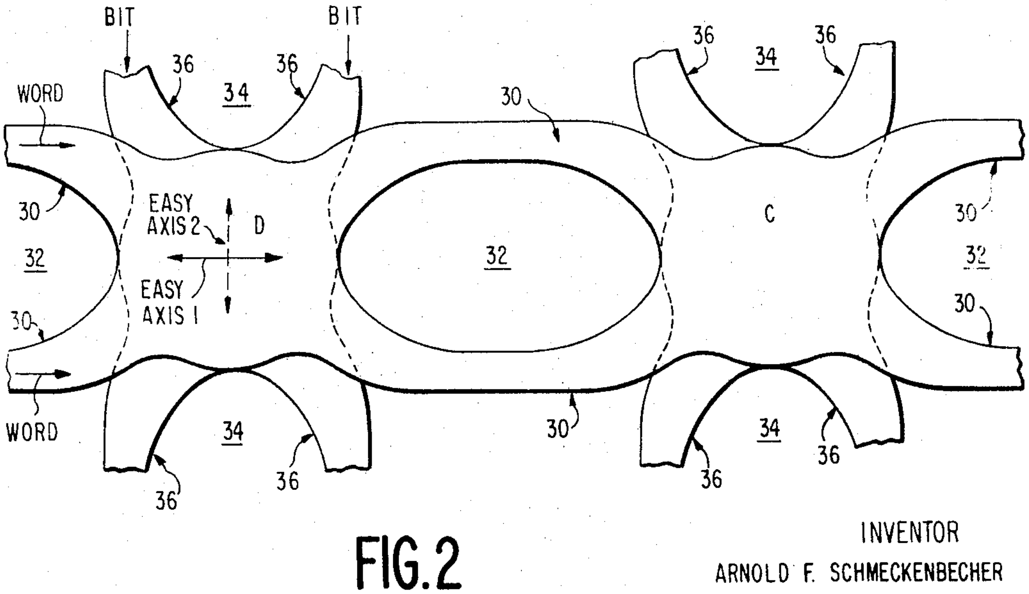
FIGURE 2 is a top view of an alternate embodiment of the storage matrix.

In FIGURE 2 there is shown a partial embodiment of the storage matrix which differs from FIGURE 1 in that the row neck elements 32 are split into two portions 30 and column neck elements 34 are split into two portions 36. The neck portions 30 and 36 are slightly widened at the area where they contact the discs B and C as is apparent in FIGURE 2.

The storage matrix of FIGURE 2 may be formed in the same manner as the storage matrix of FIGURE 1. However, in certain applications isotropic magnetic films may be desirable. In this case, in fabricating the storage matrix shown in FIGURE 2, an orienting magnetic field is not applied during the deposition of the thin magnetic film. The matrix is first coated with a film of plastic or glass, and the deposition of a thin magnetic film of the nickel-iron type on plastics or glass without an orienting field applied during deposition usually exhibits a magnetically isotropic characteristic on a microscopic scale. However, due to the construction of the storage elements as shown in FIGURE 2, the shortest flux paths are at right angles to each other leading to two preferred directions of magnetization, or easy axes, at right angles to each other as is shown in FIGURE 2. Such "biaxial" storage elements can be used in operation modes with non-concident word and bit pulses, as described in the above-mentioned U.S. patent to E. W. Pugh, No. 3,071,756.

Combinations of the two types, such as a matrix with single bit necks and split word necks, are possible.

Operation

Data is entered into the appropriate bit storage elements by half select techniques. In FIGURE 1, for example, elements 16, 18, and 19 are set by the magnetic fields resulting from a combination of a threshold lowering current in conductor 11, which tends to drive to a hard axis state all the elements along it, and a bit selection current of appropriate polarity along a bit sense conductor such as conductor 28. The currents are supplied by word drivers and bit drivers. Unipolar word field and bipolar bit fields can thus set the individual elements to data-related remanence states along the easy axis. One data state is the 0; the other data state is the 1. The setting fields should overlap, with the hard direction field resulting from word current on a word conductor such as line 11 terminating prior to the termination of the bit field resulting from bit current on the bit-sense such as conductor 28, so that the bit current will determine the final data state.

Readout is accomplished by the hard direction magnetic field resulting from a current pulse on the word conductor such as 11. All storage elements undergo changes of state and induce output pulses on the bit-sense conductors such as 28. Sense amplifiers connected to the bit-sense conductors define data values as a function of polarity of the outputs.

In FIGURE 2, the biaxial nature of the device permits the following mode of operation:

The information is stored by having the magnetization of the bits aligned in the stable state along the direction of the word row of discs, either parallel or anti-parallel to the word row direction, representing either a 1 or a 0 respectively.

To *read out* the information, a current pulse is passed along the word line. The pulse generates a field strong enough to switch the magnetization in the discs by 90° into the stable state along the direction of the bit column of discs, generating readout voltages in the sense (bit) lines. The amplitude of the readout pulse is not limited, as long as it is sufficient to switch the magnetization in the bits by 90°.

To *write* information into a bit position, after readout occurs, a positive or negative pulse is passed along the bit line, at any arbitrary time later. The pulse generates a field strong enough to switch the magnetization by 90° into the stable state along the word direction, either parallel or anti-parallel to the word direction, representing a stored 1 or 0. A bit line in the memory matrix crosses many word lines with information stored along the word directions. To avoid disturbing this information when writing, the write pulse is limited in its amplitude to generate a field strong enough to switch the magnetization by 90° from one stable state to the other, but not to reverse it by 180°.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A magnetic storage matrix comprising:

(a) a plurality of parallel rows of electrically conductive material, each row consisting of disc-shaped members connected together by neck members wherein said neck members are parallel to the axis of said rows and wherein some of said neck members comprise two lines of electrically conductive material widened at the areas of contact with said disc members, (b) a plurality of disc-shaped insulating members superimposed on and in intimate contact with said disc-shaped members of said rows, (c) a plurality of parallel columns of electrically conductive material disposed orthogonally to said rows, each of said columns consisting of disc-shaped members connected together by neck members wherein said neck members are parallell to the axis of said columns and wherein some of said neck members comprise two lines of electrically conductive material widened at the area of contact with said disc members, each said disc element of said columns being superimposed on and in intimate contact with individual ones of said insulating discs.

(d) a magnetic film covering at least the combination of superimposed disc members of said matrix, said magnetic film having at least a first easy axis of magnetization parallel to the axis of said rows, (e) means connected to said plurality of parallel rows of electrically connective material to supply drive field energization, (f) means connected to said plurality of parallel columns of electrically conductive material to supply data field energization, and (g) means connected to said plurality of parallel columns of electricity conductive material to define output data values as a function of output signals thereon.

2. A magnetic storage matrix comprising:

(a) a plurality of parallel rows of electrically conductive material, each row consisting of disc-shaped members connected together by neck members wherein said neck members are parallel to the axis of said rows and wherein each of said neck members comprises two lines of electrically conductive material widened at the areas of contact with said disc members, (b) a plurality of disc-shaped insulating members superimposed on and in intimate contact with said disc-shaped members of said rows, (c) a plurality of parallel columns of electrically conductive material disposed orthogonally to said rows, each of said columns consisting of disc-shaped members connected together by neck members wherein said neck members are parallel to the axis of said columns and wherein each of said neck members comprises two lines of electrically conductive material widened at the areas of contact with said disc members, each said disc element of said columns being superimposed on and in intimate contact with individual ones of said insulating discs, (d) a magnetic film covering the entire combination of said rows, said columns and said insulating discs, said magnetic film having at least a first easy axis of magnetization parallel to the axis of said rows, (e) means connected to said plurality of parallel rows of electrically connective material to supply drive field energization, (f) means connected to said plurality of parallel columns of electrically conductive material to supply data field energization, and (g) means connected to said plurality of parallel columns of electrically conductive material to define output data values as a function of output signals thereon.

3. A magnetic storage matrix comprising:

(a) a plurality of parallel rows of electrically conductive material, each row consisting of disc-shaped members connected together by neck members wherein said neck members are parallel to the axis of said rows and wherein each of said neck members comprises two lines of electrically conductive material widened at the areas of contact with said disc members, (b) a plurality of disc-shaped insulating members superimposed on and in intimate contact with said disc-shaped members of said rows, (c) a plurality of parallel columns of electrically conductive material disposed orthogonally to said rows, each of said columns consisting of disc-shaped members connected together by neck members wherein said neck members are parallel to the axis of said columns and wherein each of said neck members comprises two lines of electrically conductive material widened at the areas of contact with said disc members, each said disc element of said columns being superimposed on and in intimate contact with individual ones of said insulating discs, (d) a magnetic film covering at least the combination of superimposed disc members of said matrix, said magnetic film having a first easy axis of magnetization parallel to the axis of said rows and a second easy axis of magnetization orthogonal to said first easy axis of magnetization, (e) means connected to said plurality of parallel rows of electrically connective material to supply drive field energization, (f) means connected to said plurality of parallel columns of electrically conductive material to supply data field energization, and (g) means connected to said plurality of parallel columns of electrically conductive material to define output data values as a function of output signals thereon.

References Cited

UNITED STATES PATENTS

| | | | |
|---|---|---|---|
| 2,883,447 | 4/1959 | Dahl | 174—117.5 |
| 3,030,612 | 4/1962 | Rubens et al. | 340—174 |
| 3,070,650 | 12/1962 | Stearns | 174—68.5 |
| 3,078,445 | 2/1963 | Sass | 340—173.1 |
| 3,148,358 | 9/1964 | Snyder | 340—174 |
| 3,192,512 | 6/1965 | Korkowski | 340—174 |
| 3,071,756 | 1/1963 | Pugh | 340—174 |

STANLEY M. URYNOWICZ, Jr., Primary Examiner